United States Patent
Park et al.

(10) Patent No.: US 8,271,133 B2
(45) Date of Patent: Sep. 18, 2012

(54) APPARATUS, METHOD, AND MEDIUM FOR SENSING SLIP IN MOBILE ROBOT

(75) Inventors: Jun-ho Park, Hwaseong-si (KR); Woo-yeon Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 672 days.

(21) Appl. No.: 12/219,549

(22) Filed: Jul. 23, 2008

(65) Prior Publication Data

US 2009/0157227 A1 Jun. 18, 2009

(30) Foreign Application Priority Data

Dec. 14, 2007 (KR) .................. 10-2007-0131216

(51) Int. Cl.
*G05B 19/18* (2006.01)
*G05B 15/00* (2006.01)
(52) U.S. Cl. ............... 700/253; 700/258; 901/1; 901/46
(58) Field of Classification Search .................. 700/245, 700/258; 901/1, 46
See application file for complete search history.

(56) References Cited

U.S. PATENT DOCUMENTS

| | | | |
|---|---|---|---|
| 6,481,515 B1 * | 11/2002 | Kirkpatrick et al. | 180/65.1 |
| 6,732,826 B2 * | 5/2004 | Song et al. | 180/169 |
| 7,225,500 B2 * | 6/2007 | Diehl et al. | 15/319 |
| 7,239,105 B2 * | 7/2007 | Lim et al. | 318/568.12 |
| 7,343,684 B2 * | 3/2008 | Carlisle | 33/1 M |
| 7,805,220 B2 * | 9/2010 | Taylor et al. | 700/253 |
| 7,900,310 B2 * | 3/2011 | Reindle | 15/41.1 |
| 2004/0016077 A1 * | 1/2004 | Song et al. | 15/319 |
| 2008/0154429 A1 * | 6/2008 | Lee et al. | 700/258 |

FOREIGN PATENT DOCUMENTS

| | | |
|---|---|---|
| KR | 10-2004-0062038 | 7/2004 |
| KR | 10-2006-0032880 | 4/2006 |
| KR | 10-2007-0027840 | 3/2007 |
| KR | 10-2007-0099330 | 10/2007 |

* cited by examiner

*Primary Examiner* — James P Trammell
*Assistant Examiner* — Majdi Alsomiri
(74) *Attorney, Agent, or Firm* — Staas & Halsey LLP

(57) ABSTRACT

An apparatus, method, and medium for sensing a slip in a mobile robot is provided. The apparatus for sensing a slip in a mobile robot includes a driving motor control unit to control a driving motor that rotates a plurality of driving wheels of the mobile robot, a first rotation sensor to sense a first rotation angle of the mobile robot by using the difference between traveling distances of the plurality of driving wheels, a second rotation sensor to sense a second rotation angle of the mobile robot by sensing a rotation of the mobile robot, and a slip-sensing unit to sense the slip of the mobile robot by comparing the first rotation angle with the second rotation angle. The driving motor control unit controls the driving motor to travel straight in a specified pattern.

9 Claims, 4 Drawing Sheets

......... ROTATION ANGLE OF MOBILE ROBOT CALCULATED FROM ENCODER SIGNAL
——— ROTATION ANGLE OF MOBILE ROBOT MEASURED FROM GYROSENSOR SIGNAL

......... ROTATION ANGLE OF MOBILE ROBOT CALCULATED FROM ENCODER SIGNAL
——— ROTATION ANGLE OF MOBILE ROBOT MEASURED FROM GYROSENSOR SIGNAL

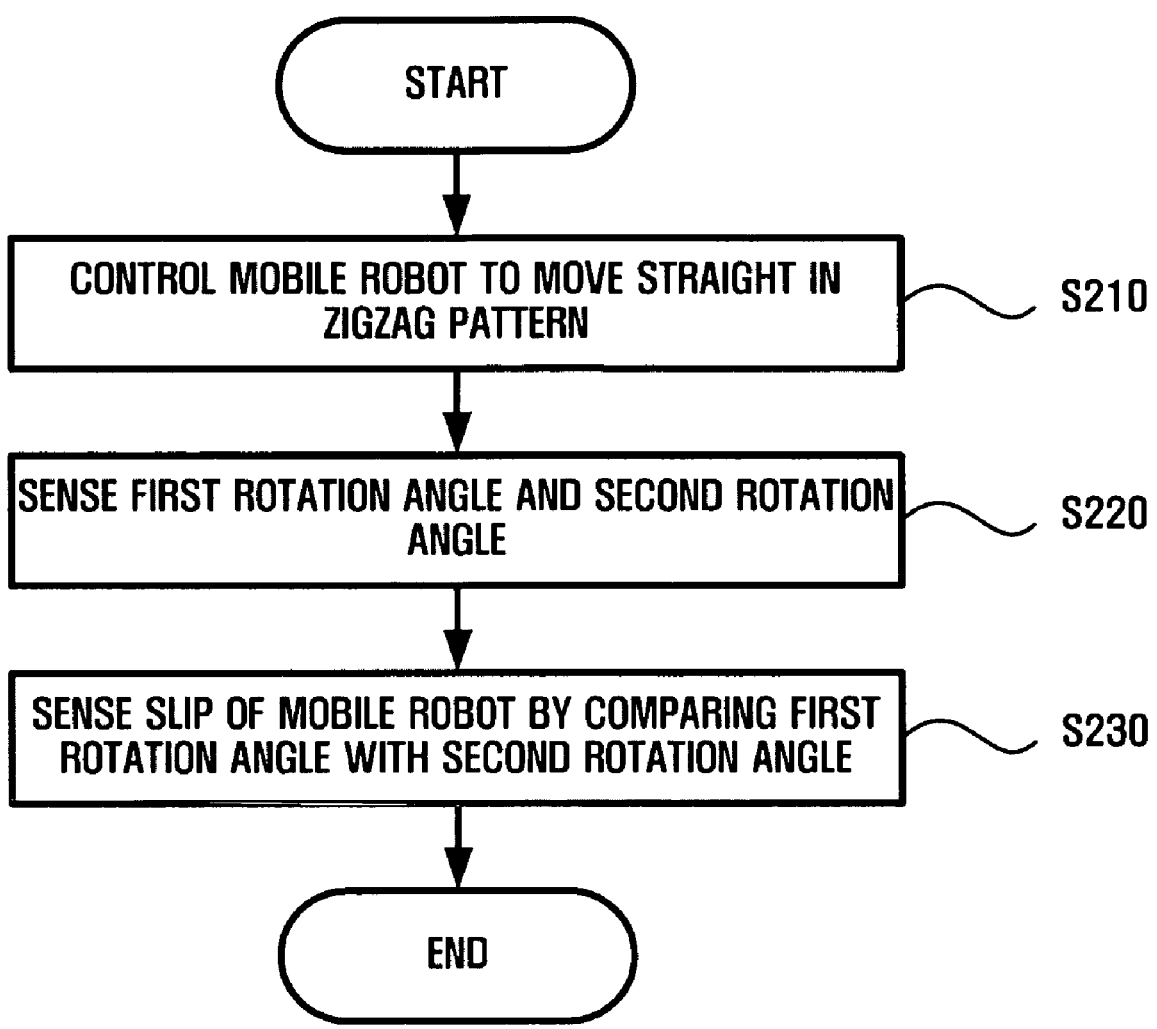

APPARATUS, METHOD, AND MEDIUM FOR SENSING SLIP IN MOBILE ROBOT

CROSS-REFERENCE TO RELATED APPLICATIONS

This application is based on and claims priority benefit from Korean Patent Application No. 10-2007-0131216, filed on Dec. 14, 2007 in the Korean Intellectual Property Office, the disclosure of which is incorporated herein in its entirety by reference.

BACKGROUND

1. Field

The present invention relates to an apparatus, method, and medium for sensing a slip in a mobile robot, and, more particularly to an apparatus, method, and medium for sensing a slip in a mobile robot that can sense a slip in a mobile robot that travels straight in a specified pattern by using an abnormal change of a travel sensor signal.

2. Description of the Related Art

Robots for use in the home or office have been put to practical use as assistants in taking care of household affairs or doing office work. Representative examples are a cleaning robot, a guide robot, and a crime prevention robot.

Such a robot performs functions as it moves in a given space. In order for a robot to travel and perform its function in a given environment, the robot must prepare a map of a surrounding space or recognize its position as it moves in a state where the map is known.

As a cleaning robot, an automatic traveling cleaner that performs cleaning as it travels, without being drawn or manipulated by a user, has been developed. This mobile robot may lose its position due to an obstacle such as a wall or a projection on a bottom surface while it performs its duties.

For example, if the mobile robot crosses a projection on a bottom surface or is caught in a narrow space as it travels below furniture such as a chair, a sofa, or the like, a main body of the mobile robot is stopped, but its wheels continue rotating (a slip). Here, the term "slip" denotes that the actual speed of the mobile robot differs from the speed of the mobile robot that is calculated through the rotation of the wheels attached to the mobile robot.

When a slip occurs, the mobile robot cannot properly detect its speed, and this may disturb the detection of an accurate position. For example, in the case of detecting the position of the mobile robot in a state that the mobile robot cannot sense the slip occurrence, an error may occur in detecting the position.

Accordingly, there is a need for an apparatus, method, and medium for sensing whether a slip has occurred while a mobile robot travels.

SUMMARY

An aspect of the present invention is to solve the above-mentioned problems occurring in the prior art, and is to sense a slip in a mobile robot that travels straight in a specified pattern by using an abnormal change of a travel sensor signal.

Additional advantages, objects and features of the invention will be set forth in part in the description which follows and in part will become apparent to those having ordinary skill in the art upon examination of the following or may be learned from practice of the invention.

In an aspect of the present invention, there is provided an apparatus for sensing a slip in a mobile robot which includes a driving motor control unit to control a driving motor that rotates a plurality of driving wheels of the mobile robot; a first rotation sensor to sense a first rotation angle of the mobile robot by using a difference between the traveling distances of the plurality of driving wheels; a second rotation sensor to sense a second rotation angle of the mobile robot by sensing a rotation of the mobile robot; and a slip-sensing unit to sense slip of the mobile robot by comparing the first rotation angle with the second rotation angle; wherein the driving motor control unit controls the driving motor to travel straight in a specified pattern.

In another aspect of the present invention, there is provided a method of sensing a slip in a mobile robot, which includes controlling a driving motor that rotates a plurality of driving wheels of the mobile robot so that the mobile robot travels straight in a specified pattern; sensing a first rotation angle of the mobile robot by using a difference between traveling distances of the plurality of driving wheels, and sensing a second rotation angle of the mobile robot by sensing a rotation of the mobile robot; and sensing slip of the mobile robot by comparing the first rotation angle with the second rotation angle.

BRIEF DESCRIPTION OF THE DRAWINGS

These and/or other aspects, features, and advantages will become apparent and more readily appreciated from the following description of embodiments, taken in conjunction with the accompanying drawings of which:

FIG. 5 is a flowchart illustrating a method of sensing a slip in a mobile robot according to an embodiment of the present invention.

DETAILED DESCRIPTION OF EMBODIMENTS

Figure 1:
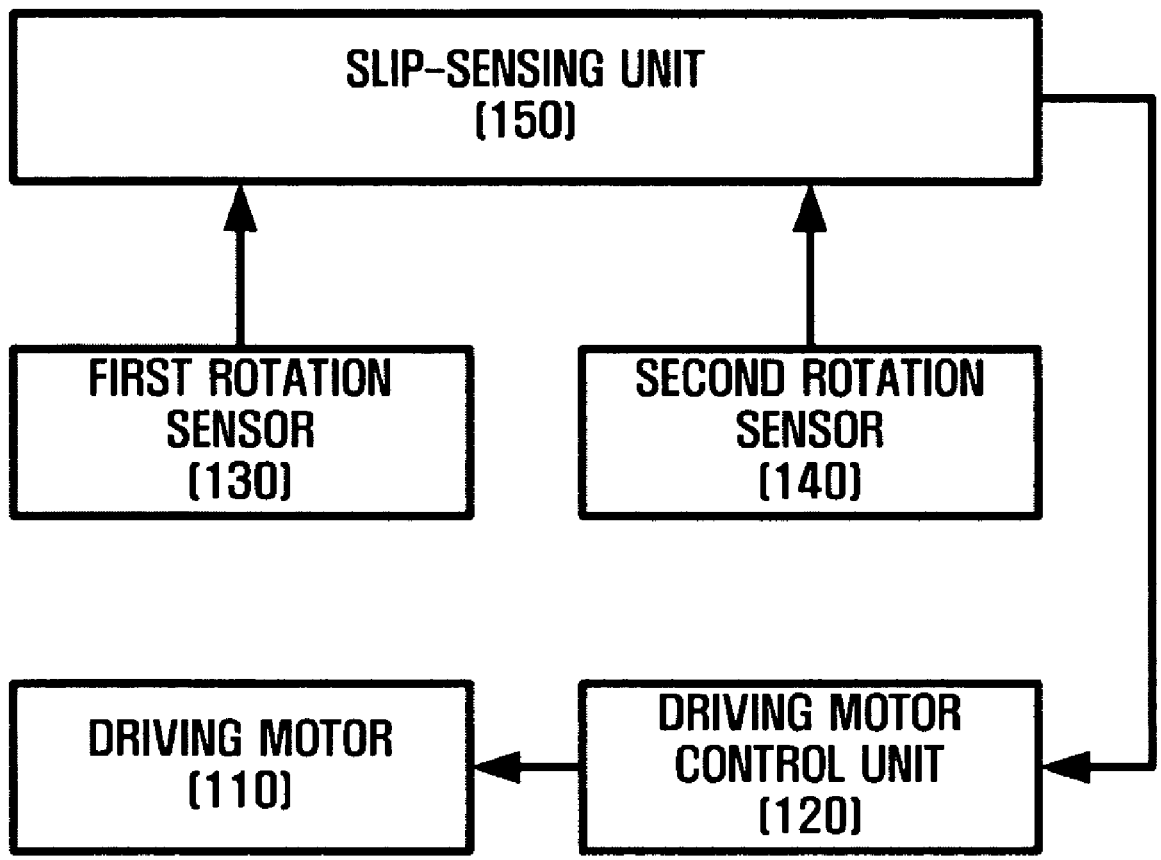
FIG. 1 is a block diagram illustrating the construction of an apparatus for sensing a slip in a mobile robot according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

The present invention will be described herein with reference to the accompanying drawings illustrating block diagrams and flowcharts for explaining an apparatus and method for sensing a slip in a mobile robot according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

FIG. 1 is a block diagram illustrating the construction of an apparatus for sensing a slip in a mobile robot according to an embodiment of the present invention.

The apparatus for sensing a slip in a mobile robot according to an embodiment of the present invention includes a driving motor control unit 120 controlling a driving motor 110, a first rotation sensor 130, a second rotation sensor 140, and a slip-sensing unit 150.

In embodiments of the present invention, the term "unit", as used herein, may be implemented as a kind of module. Here, the term "module" denotes, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and modules or further separated into additional components and modules.

The driving motor control unit 120 controls the driving motor 110 that rotates driving wheels of the mobile robot 100. Accordingly, the mobile robot 100 moves along a path determined under the control of the driving motor control unit 120.

Generally, the mobile robot 100 moves along the entire moving path obtained through a combination of straight paths. For example, in the case of cleaning a room, a cleaning robot performs the cleaning as it moves along the combination of straight paths for cleaning the whole floor of a room. In an embodiment of the present invention, the driving motor control unit 120 controls the driving motor 110 to make the mobile robot 100 move straight in a specified pattern.

Figure 2:
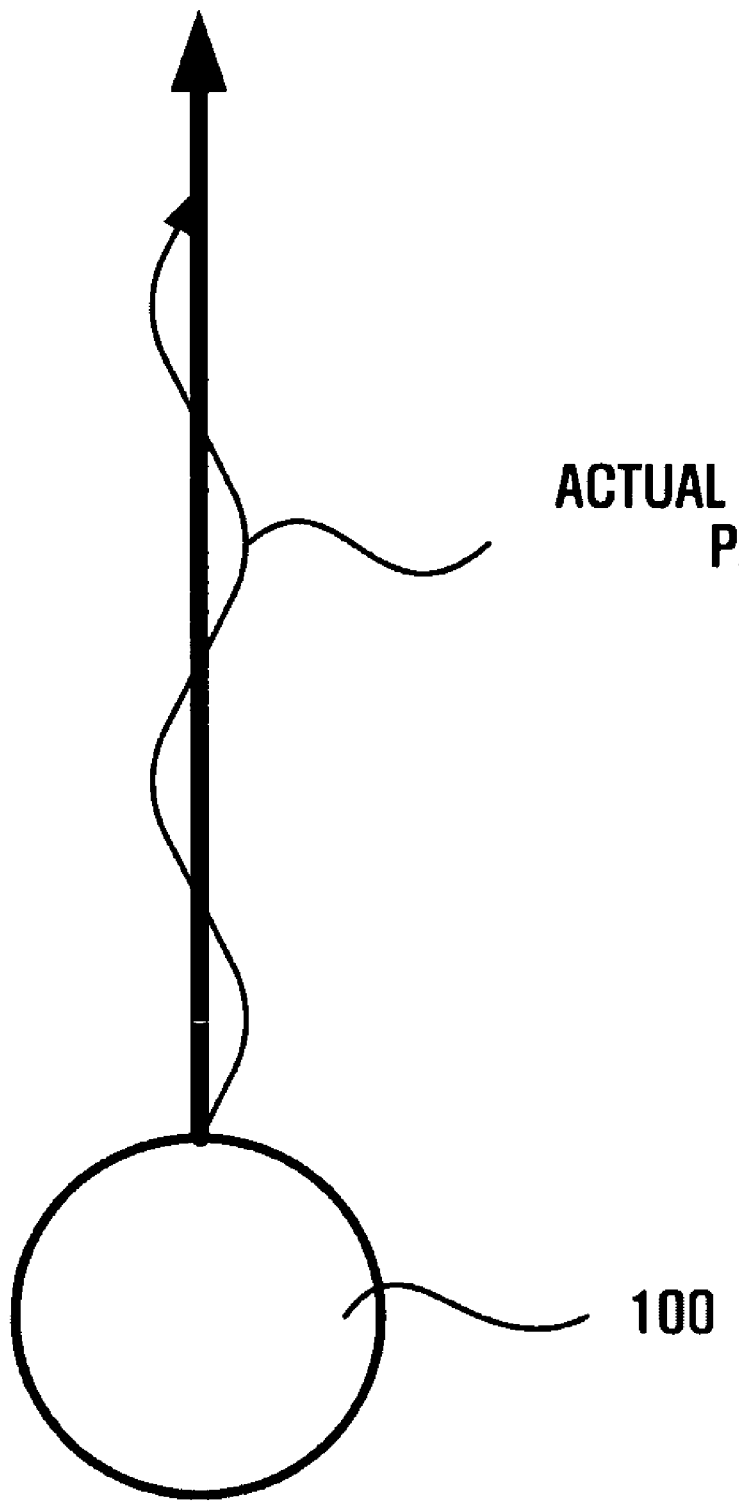
FIG. 2 is a view explaining straight traveling of a mobile robot in S-pattern according to an embodiment of the present invention.

FIG. 2 is a view explaining straight traveling of a mobile robot 100 in an S-pattern according to an embodiment of the present invention.

The straight movement in a specified pattern denotes that the traveling path of the mobile robot 100 is straight traveling in its entirety, but is actually an S-pattern or in zigzag pattern in which the mobile robot moves left and right within a predetermined angle range. It is preferable that the mobile robot 100 travels as it moves left and right in an angle range in which a person recognizes the movement of the mobile robot as the straight movement. For example, if the mobile robot travels in an S-pattern, i.e., if the mobile robot travels as it moves left and right within a small angle range of $-0.5°$ to $+0.5°$, the human eye recognizes it as the straight movement although the movement of the mobile robot is actually an S-pattern.

Referring to FIG. 1, the first rotation sensor 130 senses the first rotation angle by using the difference between traveling distances of a plurality of driving wheels. If the rotation angle $\Theta$ of the driving wheel is known, the traveling distance according to the rotation of the driving wheel can be obtained by multiplying the rotation angle $\Theta$ of the driving wheel by the radius r of the driving wheel. Accordingly, if it is assumed that the mobile robot 100 moves through two left and right driving wheels and the rotation angles of the left and right wheels measured by an encoder are $\Theta_L$ and $\Theta_R$, respectively, the traveling distances according to the rotation of the left and right wheels are $r*\Theta_L$ and $r*\Theta_R$, respectively. These traveling distances according to the rotation of the driving motor 110 may differ from the actual moving distances through the actual left and right wheels when a slip occurs. Then, by obtaining the difference between the traveling distances of the left and right wheels $r*\Theta_L - r*\Theta_R$ and dividing the obtained difference by a distance D between the two wheels, the first rotation angle of the mobile robot 100 according to the rotation of the driving motor can be obtained.

The second rotation sensor 140 is mounted on the mobile robot 100, and senses the second rotation angle by sensing the rotation of the mobile robot 100. An example of the second rotation sensor 140 may be a gyrosensor. The rotation angle can be easily obtained by measuring an angular velocity of the mobile robot through the gyrosensor and integrating the measured angular velocity over time. At this time, if it is assumed that the obtained rotation angle is the rotation angle of the mobile robot 100, the rotation angle around an axis in a direction perpendicular to a bottom surface on which the mobile robot 100 moves is measured. Accordingly, the second rotation sensor according to an embodiment of the present invention can be constructed by using a one-axis gyrosensor.

The slip-sensing unit 150 senses the slip of the mobile robot 100 by comparing the first rotation angle and the second rotation angle sensed by the first rotation sensor 130 and the second rotation sensor 140, respectively.

As described above, since the driving motor control unit 120 controls the driving motor 110 to move the mobile robot 100 straight in a specified pattern such as an S-pattern, the first rotation angle of the mobile robot 100 that is calculated by using an encoder signal sensed by the first rotation sensor 130 may be changed within a specified angle range. This is because the left and right wheels are rotated to move the mobile robot in a zigzag pattern under the control of the driving motor control unit 120, regardless of whether a slip occurs.

If no slip occurs, the second rotation angle of the mobile robot 100 sensed by the second rotation sensor 140 is changed in a pattern similar to that of the first rotation angle sensed by the first rotation sensor 130. However, if the mobile robot 100 meets an obstacle such as a wall, the main body of the mobile robot 100 is stopped, but the wheels are continuously rotated to cause the occurrence of the slip. At this time, the second rotation angle of the mobile robot sensed by the second rotation sensor 140 is not in the specified pattern in which the second rotating angle is changed when the mobile robot normally travels.

Figure 3:
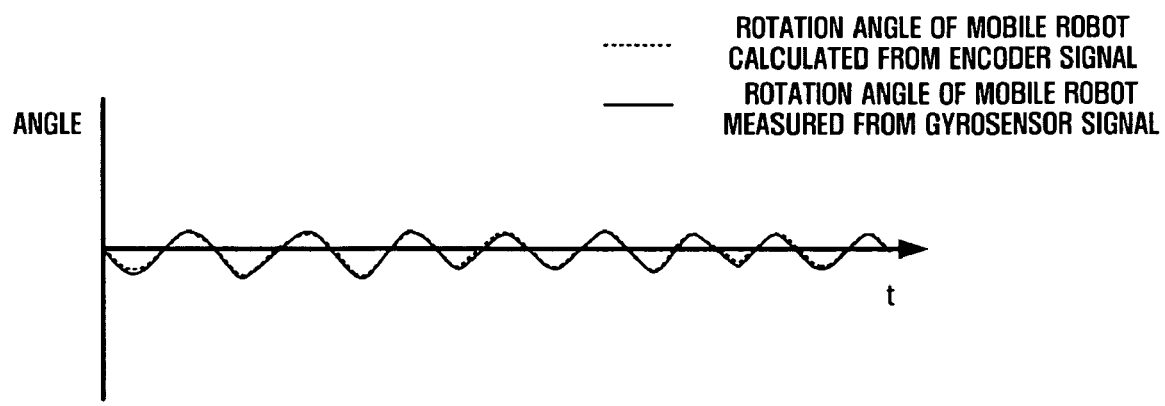
FIG. 3 is a graph illustrating a first rotation angle of a mobile robot calculated by an encoder and a second rotation angle sensed by a gyrosensor when no slip occurs in the mobile robot that travels straight in S-pattern according to an embodiment of the present invention.
Figure 4:
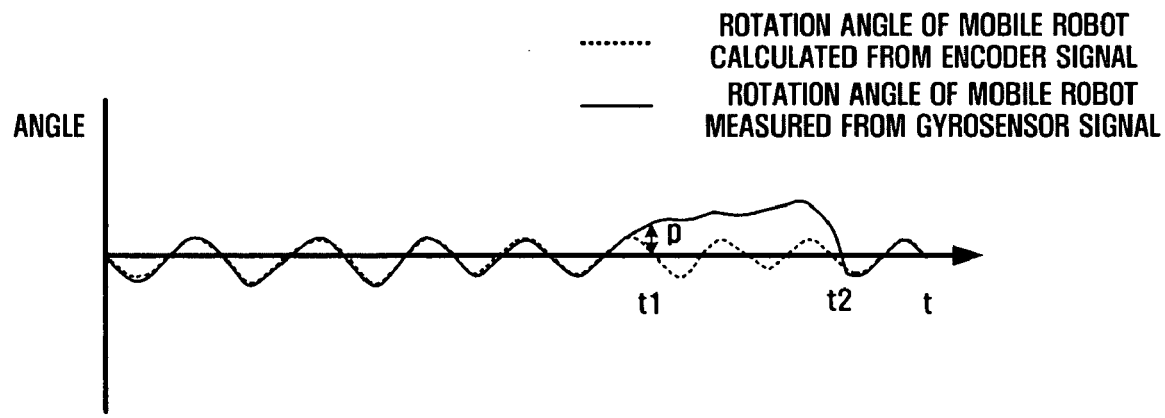
FIG. 4 is a graph illustrating a first rotation angle of a mobile robot calculated by an encoder and a second rotation angle sensed by a gyrosensor when a slip occurs in the mobile robot that travels straight in S-pattern according to an embodiment of the present invention.

FIG. 3 is a graph illustrating the first rotation angle of the mobile robot calculated by the encoder and the second rotation angle sensed by the gyrosensor when no slip occurs in the mobile robot 100 that travels straight in S-pattern according to an embodiment of the present invention. FIG. 4 is a graph illustrating the first rotation angle of the mobile robot calculated by the encoder and the second rotation angle sensed by the gyrosensor when a slip occurs in the mobile robot 100 that travels straight in zigzag pattern according to an embodiment of the present invention.

FIG. 3 shows the first rotation angle and the second rotation angle of the mobile robot 100 measured during the normal traveling of the mobile robot, i.e., when no slip occurs. In FIG. 3, a dotted line indicates the first rotation angle of the mobile robot 100 calculated from the encoder signal, and a solid line indicates the second rotation angle of the mobile robot 100 sensed from the gyrosensor signal. As the mobile robot 100 travels straight in S-pattern, the first rotation angle and the second rotation angle are changed in the specified pattern, and are almost similar to each other.

FIG. 4 shows the first rotation angle and the second rotation angle of the mobile robot 100 measured when a slip occurs. In the same manner, a dotted line indicates the first rotation angle of the mobile robot 100 calculated from the encoder signal, and a solid line indicates the second rotation angle of the mobile robot 100 sensed from the gyrosensor signal. Before the occurrence of the slip, the first rotation angle of the mobile robot 100 calculated from the encoder signal shows a similar pattern to that when no slip occurs as shown in FIG. 3.

However, if a slip occurs at time t1, the second rotation angle of the mobile robot 100 sensed from the gyrosensor signal deviates from the specified pattern occurring during the normal traveling of the mobile robot. That is, if the slip occurs, the mobile robot 100 cannot move due to the obstacle, whereas the driving wheels are continuously rotated according to a control command from the driving motor control unit 120, and thus the second rotation angle of the mobile robot 100 sensed from the gyrosensor signal deviates from the specified pattern. At time t2 after the slip occurrence is sensed, the mobile robot 100 changes its path to move in another direction, and thus moves again in the normal pattern after the time t2.

In an embodiment of the present invention, if the difference between the first rotation angle sensed by the first rotation sensor 130 and the second rotation angle sensed by the second rotation sensor 140 exceeds a specified threshold value (e.g., "p" in FIG. 4), the slip occurrence is sensed. If no slip occurs as described above, the first rotation angle and the second rotation angle are changed in a similar pattern, while if the difference between the first and second rotation angles becomes greater, the slip occurrence is sensed.

FIG. 5 is a flowchart illustrating a method of sensing a slip in a mobile robot according to an embodiment of the present invention.

First, the mobile robot 100 moves along the traveling path. At this time, the driving motor control unit 120 sends a control command to the driving motor 110 that rotates the driving wheels so that the mobile robot 100 moves straight in zigzag pattern S210.

Then, the first rotation sensor 130 senses the first rotation angle of the mobile robot by using the difference between the traveling distances of the driving wheels, and the second rotation sensor 140 senses the second rotation angle of the mobile robot by sensing the rotation of the mobile robot S220. In this case, the first rotation sensor 130 may be an encoder, and the second rotation sensor 140 may be a gyrosensor.

Then, the slip-sensing unit 150 senses the slip of the mobile robot 100 by comparing the first rotation angle obtained by the first rotation sensor 130 with the second rotation angle obtained by the second rotation sensor 140 S230. At this time, if the difference between the first rotation angle and the second rotation angle obtained from the first rotation sensor 130 and the second rotation sensor 140, respectively, becomes larger than the specified threshold value, the slip-sensing unit 150 senses the slip occurrence.

If the slip occurrence is sensed, the mobile robot 100 may change its traveling path to get out of the slip state, or inform a user of the slip occurrence.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code/instructions.

The computer readable code/instructions can be recorded/transferred on a medium in a variety of ways, with examples of the medium including computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), a CD-R (Recordable)/Rewritable, and DVD-R (Recordable/Rewritable). The media may also be a distributed network, so that the computer readable code/instructions is/are stored/transferred and executed in a distributed fashion. Still further, as only an example, the processing element could include a processor or a computer processor, and processing elements may be distributed and/or included in a single device.

For example, embodiments can be implemented in computing hardware (computing apparatus) and/or software, such as (in a non-limiting example) any computer that can store, retrieve, process and/or output data and/or communicate with other computers. Software includes computer readable code/instructions. The computer readable code/instructions may form a program. The results produced by the implementation of the software can be displayed on a display of the computing hardware. A program/software implementing embodiments may be recorded on computer-readable media comprising computer-readable recording media discussed above.

Further, according to an aspect of embodiments, any combination of the described features, functions and/or operations can be implemented.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for sensing a slip in a mobile robot, comprising:
   a driving motor control unit to control a driving motor that rotates a plurality of driving wheels of the mobile robot;
   a first rotation sensor to sense a first rotation angle of the mobile robot by using a difference between traveling distances of the plurality of driving wheels;
   a second rotation sensor to sense a second rotation angle of the mobile robot by sensing a rotation of the mobile robot; and
   a slip-sensing unit to sense slip of the mobile robot by comparing the first rotation angle with the second rotation angle,
   wherein the driving motor control unit controls the driving motor to travel straight in an S-pattern, and
   wherein the slip-sensing unit senses the slip occurrence if the difference between the first rotation angle and the second rotation angle is larger than a predetermined non-zero threshold value,
   wherein each of the first rotation angle and the second rotation angle of the mobile robot measured by the first rotation sensor and the second rotation sensor is a rotation angle around an axis in a direction perpendicular to a bottom surface, such that the first rotation angle and the second rotation angle are perpendicular to each other, and
   wherein the plurality of driving wheels are rotated independently.

2. The apparatus of claim 1, wherein the first rotation sensor is an encoder.

3. The apparatus of claim 1, wherein the second rotation sensor is a gyrosensor.

4. A method of sensing a slip in a mobile robot, comprising:
   controlling a driving motor that rotates a plurality of driving wheels of the mobile robot so that the mobile robot travels straight in an S-pattern;
   sensing a first rotation angle of the mobile robot by using the difference between traveling distances of the plurality of driving wheels, and sensing a second rotation angle of the mobile robot by sensing a rotation of the mobile robot; and
   sensing slip of the mobile robot by comparing the first rotation angle with the second rotation angle,
   wherein the slip sensing comprises sensing slip if a difference between the first rotation angle and the second rotation angle is larger than a predetermined non-zero threshold value,
   wherein each of the first rotation angle and the second rotation angle of the mobile robot measured by the first rotation sensor and the second rotation sensor is a rotation angle around an axis in a direction perpendicular to a bottom surface, such that the first rotation angle and the second rotation angle are perpendicular to each other, and
   wherein the plurality of driving wheels are rotated independently.

5. The method of claim 4, wherein sensing the first rotation angle is implemented by an encoder.

6. The method of claim 4, wherein sensing the second rotation angle is implemented by a gyrosensor.

7. The apparatus of claim 1, wherein the first rotation angle is obtained by calculating a difference between a product of a radius of the driving wheel and a rotation angle of the driving wheel, for each of a left and a right driving wheel, and dividing the calculated difference by a distance between the left and the right driving wheel.

8. The apparatus of claim 1, wherein the S-pattern of the path of the traveling mobile robot is a zigzag-pattern.

9. The apparatus of claim 1, wherein the slip-sensing unit to sense slip of the mobile robot when the first rotation angle and the second rotation angle are not changed in a similar pattern.

* * * * *